United States Patent
Gao et al.

(10) Patent No.: US 12,412,148 B2
(45) Date of Patent: Sep. 9, 2025

(54) CART-BASED AVAILABILITY DETERMINATION FOR AN ONLINE CONCIERGE SYSTEM

(71) Applicant: Maplebear Inc., San Francisco, CA (US)

(72) Inventors: Lin Gao, Miami, FL (US); Yilin Huang, Shanghai (CN); Shiyuan Yang, Shanghai (CN); Hao Wu, Shanghai (CN); Ganglu Wu, Shanghai (CN); Xiao Zhou, Shanghai (CN)

(73) Assignee: Maplebear Inc., San Francisco, CA (US)

( * ) Notice: Subject to any disclaimer, the term of this patent is extended or adjusted under 35 U.S.C. 154(b) by 0 days.

(21) Appl. No.: 17/936,232

(22) Filed: Sep. 28, 2022

(65) Prior Publication Data

US 2024/0054449 A1   Feb. 15, 2024

Related U.S. Application Data

(63) Continuation of application No. PCT/CN2022/111574, filed on Aug. 10, 2022.

(51) Int. Cl.
 *G06Q 10/087* (2023.01)
 *G06V 20/52* (2022.01)

(52) U.S. Cl.
 CPC .......... *G06Q 10/087* (2013.01); *G06V 20/52* (2022.01)

(58) Field of Classification Search
 None
 See application file for complete search history.

(56) References Cited

U.S. PATENT DOCUMENTS 10,832,305 B1 * 11/2020 Woodbeck .......... G06F 16/5866
2009/0059270 A1 * 3/2009 Opalach ................. G06V 20/64
                                                        358/1.15

(Continued)

FOREIGN PATENT DOCUMENTS

CN    101976377 A    2/2011
CN    110914843 A    3/2020

OTHER PUBLICATIONS

PCT International Search Report and Written Opinion, PCT Application No. PCT/CN2022/111574, Apr. 20, 2023, 8 pages.

*Primary Examiner* — Florian M Zeender
*Assistant Examiner* — Kimberly S. Bursum
(74) *Attorney, Agent, or Firm* — Fenwick & West LLP

(57) ABSTRACT

An online concierge system may use images received from shopping carts within retailers to determine the availability of items within those retailers. A shopping cart includes externally-facing cameras that automatically capture images of the area around the shopping cart as the shopping cart travels through a retailer. The online concierge system receives these images, which depict displays within the retailers from which a picker or a retailer patron can collect items. The online concierge system determines which items should be depicted in the images and which items are actually depicted in the images. The online concierge system identifies which items should be depicted, but are not depicted, and determines that these items are unavailable (e.g., out of stock) at that retailer. The online concierge system updates an availability database to indicate that these items are unavailable and may notify the retailer that the item is unavailable.

19 Claims, 6 Drawing Sheets

(56) References Cited

U.S. PATENT DOCUMENTS

| | | |
|---|---|---|
| 2015/0127496 A1 | 5/2015 | Marathe et al. |
| 2018/0005035 A1* | 1/2018 | Bogolea ................. G06V 20/20 |
| 2019/0034864 A1* | 1/2019 | Skaff ................... G06Q 10/087 |
| 2019/0043003 A1 | 2/2019 | Fisher et al. |
| 2019/0149725 A1* | 5/2019 | Adato ...................... H04N 1/00 |
| | | 348/158 |
| 2020/0151692 A1* | 5/2020 | Gao ..................... G06Q 20/201 |
| 2021/0012272 A1* | 1/2021 | Dugar ................... G06T 7/0008 |
| 2021/0287271 A1 | 9/2021 | Prasad et al. |
| 2023/0097019 A1* | 3/2023 | Narendra ................. G06F 3/14 |
| | | 382/103 |
| 2023/0177457 A1* | 6/2023 | Francis .............. G06Q 30/0601 |
| | | 705/26.81 |

\* cited by examiner

CART-BASED AVAILABILITY DETERMINATION FOR AN ONLINE CONCIERGE SYSTEM

CROSS-REFERENCE TO RELATED APPLICATIONS

The present application is a continuation application of co-pending Patent Cooperation Treaty (PCT) International Application No. PCT/CN2022/111574 filed on Aug. 10, 2022, with the China National Intellectual Property Office as the Receiving Office, which is herein incorporated by reference.

BACKGROUND

An online concierge system is an online system that allows a user to order items from a retailer for delivery to the user. An online concierge system may be operated by a third party that coordinates pickers to collect items from retailer locations to service user orders, but the online concierge system may not be operated by the retailers themselves. As such, the online concierge system may lack access to inventory and availability data for items offered for sale at different retailer locations. The online concierge system can request this data from retailers, but the data may not be formatted such that the online concierge system can easily use it. Furthermore, different retailers may record different information when tracking their inventory. For example, one retailer may record inventory on a location-by-location basis, whereas another retailer may record their inventory based on regions within which their locations are situated. Thus, even if retailers were willing to provide their inventory data to the online concierge system, the online concierge system may require complex systems to ensure that the data from each retailer is consistent and can be used. Thus, online concierge systems may require significant computing resources to generate availability data for different retailers and different locations.

SUMMARY

In accordance with one or more aspects of the disclosure, an online concierge system may use images received from shopping carts within retailer locations to determine the availability of items within those retailer locations. A shopping cart includes externally-facing cameras that automatically capture images of the area around the shopping cart as the shopping cart travels through a retailer location. The online concierge system receives these images from these shopping carts. These images depict displays within the retailer locations from which a picker or a retailer patron can collect items. The online concierge system determines which items should be depicted in the images and which items are actually depicted in the images. The online concierge system identifies which items should be depicted, but are not depicted, and determines that these items are unavailable (e.g., out of stock) at that retailer location. The online concierge system updates an availability database to indicate that these items are unavailable and may notify the retailer that the item is unavailable. The online concierge system also may have a picker verify that the items are actually unavailable within the retailer location.

The online concierge system uses the availability database to keep track of which items are available and adjusts the presentation of items to users accordingly. For example, a customer may transmit a search query to the online concierge system requesting that the online concierge system provide items that relate to the search query. The online concierge system may generate a set of candidate items, but may check the availability database to ensure that these items are available. If an item is not available, the online concierge system may filter that item out from the set of items sent to the user's client device for presentation to the user. The online concierge system also may still transmit the unavailable item to the user, but with instructions that the unavailable item be presented with an indication that the item is unavailable.

By determining the availability of items based on images captured by a shopping cart, the online concierge system does not need to reformat or interpret data from independent systems, thereby reducing the computational load on the online concierge system. Additionally, by reducing or eliminating the requirement for human interaction to determine the availability of items, the online concierge system reduces the operational costs of creating an up-to-date availability database for items offered by a retailer.

DETAILED DESCRIPTION

Environment of an Online Concierge System

Figure 1:
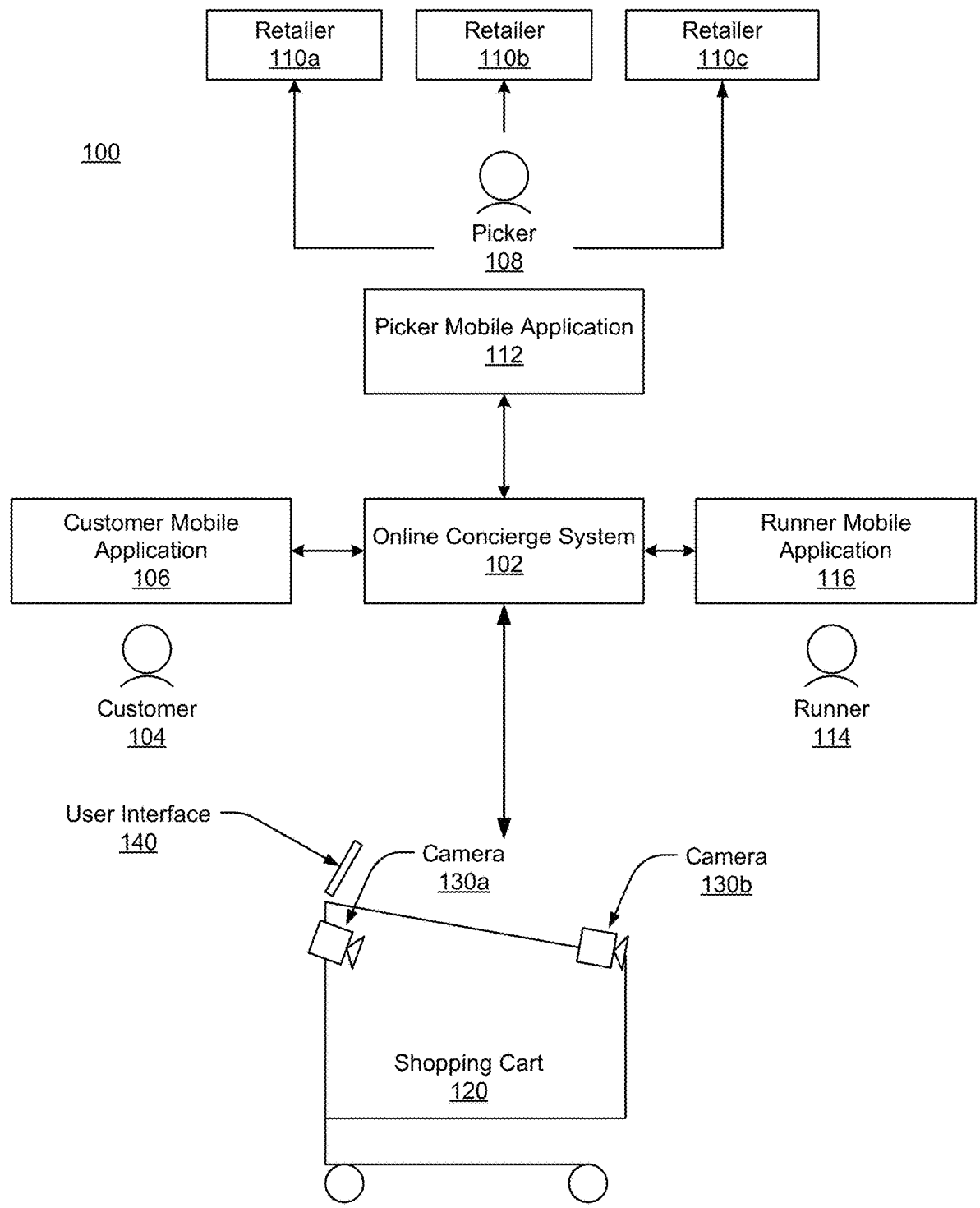
FIG. 1 illustrates the environment of an online concierge system, in accordance with some embodiments.

FIG. 1 illustrates an example system environment 100 of an online concierge system 102, according to some embodiments. The system environment 100 illustrated in FIG. 1 includes an online concierge system 102, a customer 104, a customer mobile application 106, a picker 108, one or more retailers 110, a picker mobile application 112, a runner 114 and a runner mobile application 116. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

Additionally, the figures use like reference numerals to identify like elements. A letter after a reference numeral, such as "110*a*," indicates that the text refers specifically to the element having that particular reference numeral. A reference numeral in the text without a following letter, such as "110," refers to any or all of the elements in the figures bearing that reference numeral. For example, "110" in the text refers to reference numerals "110*a*" and/or "110*b*" in the figures.

The environment 100 includes an online concierge system 102. The online concierge system 102 is configured to receive orders from one or more customers 104 (only one is shown for the sake of simplicity). An order specifies a list of goods or items to be delivered to the customer 104. Goods, items, and products may be used synonymously herein to mean any item that a customer 104 can purchase via the online concierge system. The order also specifies the location to which the goods are to be delivered, and a time window during which the goods should be delivered. In some embodiments, the order specifies one or more retailers from which the selected items should be purchased. The customer may use a customer mobile application (CMA) 106 to place the order; the CMA 106 is configured to communicate with the online concierge system 102.

The online concierge system 102 is configured to transmit orders received from customers 104 to one or more pickers 108. A picker 108 may be a contractor, employee, or other person (or entity) who is enabled to fulfill orders received by the online concierge system 102. The environment 100 also includes three retailers 110a, 110b, and 110c (only three are shown for the sake of simplicity; the environment could include any number of retailers). The retailers 110 may be physical retailers, such as grocery stores, discount stores, department stores, etc., or non-public warehouses storing items that can be collected and delivered to customers. As used herein, a "retailer" is an entity that operates "retailer locations," which are physical buildings or stores in which the retailer operates. Each picker 108 fulfills an order received from the online concierge system 102 at one or more retailers 110, delivers the order to the customer 104, or performs both fulfillment and delivery. In some embodiments, pickers 108 make use of a picker mobile application 112 which is configured to interact with the online concierge system 102.

The shopping cart 120 is a vessel that a user can use to hold items as the user travels through a retailer location. The shopping cart 120 includes one or more cameras 130 that capture image data of the shopping cart's storage area and a user interface 140 that the user can use to interact with the shopping cart 120. The shopping cart 120 may include additional components not pictured in FIG. 1, such as processors, computer-readable media, power sources (e.g., batteries), network adapters, or sensors (e.g., load sensors, thermometers, proximity sensors).

The cameras 130 capture image data of the shopping cart's storage area. The cameras 130 may include internally-facing cameras 130a that capture two-dimensional or three-dimensional images of the shopping cart's contents. These cameras 130s are coupled to the shopping cart 100 such that the cameras 130a capture image data of the storage area from different perspectives. Thus, items in the shopping cart 120 are less likely to be overlapping in all camera perspectives. In some embodiments, the cameras 130 include embedded processing capabilities to process image data captured by the cameras 130. For example, the cameras 130 may be MIPI cameras.

The shopping cart 100 may include one or more sensors that capture measurements describing the shopping cart 100, items in the shopping cart's storage area, or the area around the shopping cart 100. For example, the shopping cart 100 may include load sensors that measure the weight of items placed in the shopping cart's storage area. Similarly, the shopping cart 100 may include proximity sensors that capture measurements for detecting when an item is being added to the shopping cart 100. The shopping cart 100 may transmit data from the one or more sensors to the online concierge system 102.

In some embodiments, the shopping cart 120 captures a set of image data in response to detecting that an item is being added to the storage area. The shopping cart 120 may detect that an item is being added based on sensor data from sensors on the shopping cart 120. For example, the shopping cart 120 may detect that a new item has been added when the shopping cart 120 detects a change in the overall weight of the contents of the storage area based on load data from load sensors. Similarly, the shopping cart 120 may detect that a new item is being added based on proximity data from proximity sensors indicating that something is approaching the storage area of the shopping cart 120. The shopping cart 120 captures image data within a timeframe near when the shopping cart 120 detects a new item. For example, the shopping cart 120 may activate the cameras 130 and store image data in response to detecting that an item is being added to the shopping cart 120 and for some period of time after that detection.

The cameras 130 may include cameras 130b that are facing externally to the shopping cart 120, meaning that the cameras 130b capture images of regions around the shopping cart 120. Each externally-facing camera 130b has a different field of view of a region around the shopping cart 120. The externally-facing cameras 130b may be oriented such that the fields of externally-facing cameras cover most or all of the area around the shopping cart 12.

In some embodiments, the externally-facing cameras 130b are oriented such that the externally-facing cameras 130b capture images of displays within a retailer location as the shopping cart 120 travels through the retailer location. Displays are structures within the retailer location for presenting items to patrons or pickers within the retailer location. For example, displays include shelves, tables, platforms, cabinets, cases, clothes racks, or boxes.

The shopping cart 120 automatically captures images using the externally-facing cameras 130b as a picker or a patron uses the shopping cart 120 to collect items in the retailer location. The shopping cart 120 may capture images using the externally-facing cameras 130b at regular intervals or in response to a trigger. For example, the externally-facing cameras 130b may capture images when the shopping cart 120 detects that the shopping cart 120 is moving or when the shopping cart 120 reaches certain locations in the retailer location. The shopping cart 120 transmits images captured by the externally-facing cameras 130b to the online concierge system 102.

The shopping cart 120 may include an indoor location system that determines the location of the shopping cart 120 within the retailer location. The indoor location system uses sensor data from sensors on the shopping cart 120 or within the retailer location to determine the location of the shopping cart. For example, the indoor location system may use GPS data from a GPS tracker coupled to the shopping cart, or may use RFID tags positioned within the retailer location to determine the location of the shopping cart 120. In some embodiments, the indoor location system uses wheel rotation data to determine the location of the shopping cart 120 within the retailer location. An example indoor location system for a shopping cart 120 is described in PCT Application No. PCT/CN2022/102796, entitled "Shopping Cart Self-Tracking in an Indoor Environment" and filed Jun. 30, 2022, which is incorporated by reference. The indoor location system regularly determines the location of the shopping cart 120, and transmits the shopping cart's location to the online concierge system 102.

The shopping cart 120 uses the indoor location system to determine the location of the shopping cart 120 at the time when the externally-facing cameras 130*b* capture images of the area around the shopping cart 120. For example, the shopping cart 120 may trigger the externally-facing cameras 130*b* to capture images of the area around the shopping cart 120 whenever the indoor location system determines the location of the shopping cart 120 (or vice versa).

The shopping cart 120 includes a user interface 140 through which the user can interact with the online concierge system 130*b*. The user interface 140 may include a display, a speaker, a microphone, a keypad, or a payment system (e.g., a credit card reader). The user interface 140 may allow the user to adjust the items in their shopping list or to provide payment information for a checkout process. Additionally, the user interface 140 may display a map of the retailer location indicating where items are located within the retailer location. In some embodiments, a user may interact with the user interface 140 to search for items within the retailer location, and the user interface 140 may provide a real-time navigation interface for the user to travel from their current location to an item within the retailer location. The user interface 140 also may display additional content to a user, such as suggested recipes or items for purchase.

Online Concierge System

Figure 2:
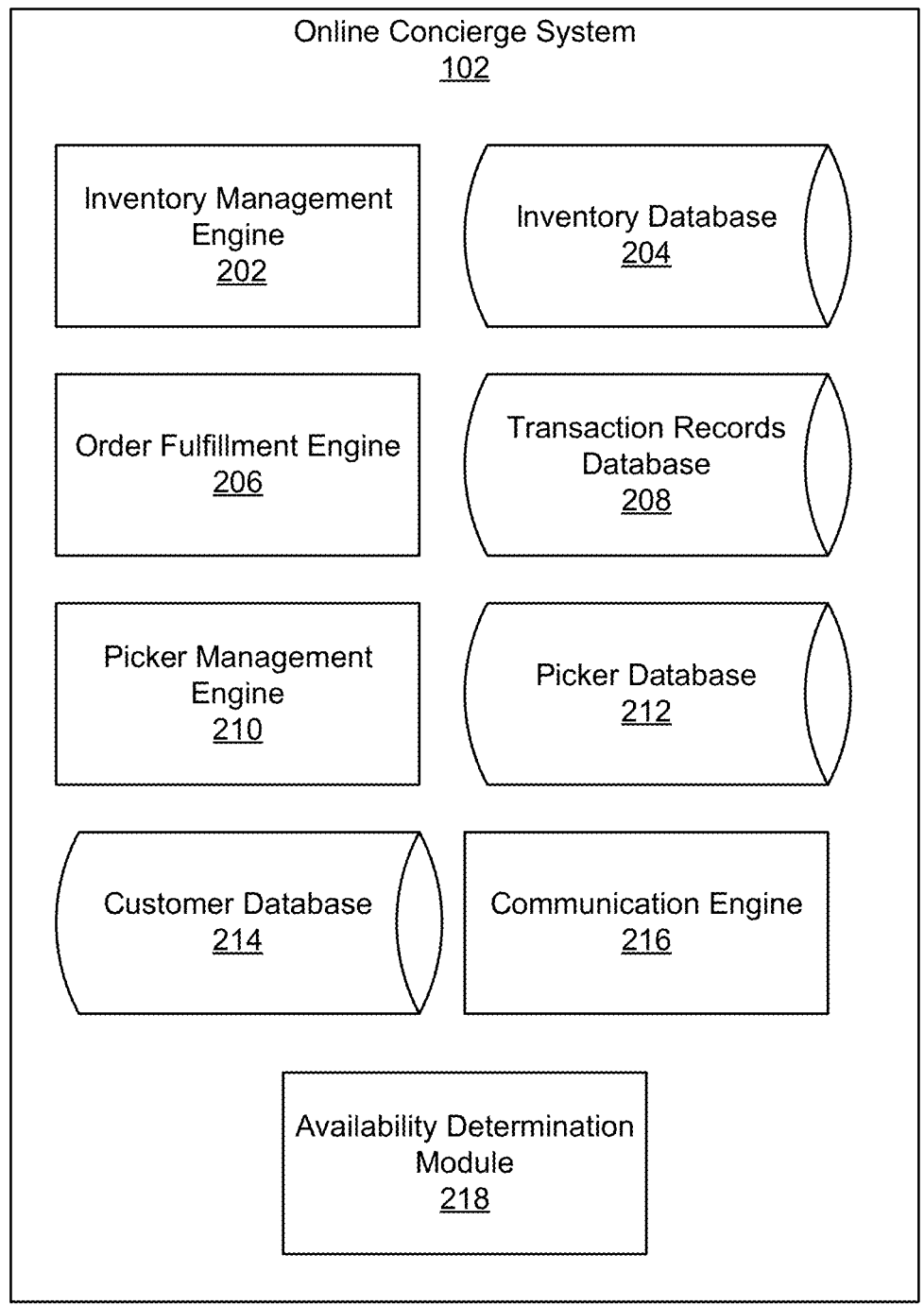
FIG. 2 is a block diagram of an online concierge system, in accordance with some embodiments.

FIG. 2 is a block diagram of an online concierge system 102, according to some embodiments. The online concierge system illustrated in FIG. 2 includes an inventory management engine 202, an inventory database 204, an order fulfillment engine 206, a transaction records database 208, a picker management engine 210, a picker database 212, a customer database 214, a communications engine 216, and an availability determination module 218. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The online concierge system 102 includes an inventory management engine 202, which interacts with inventory systems associated with each retailer 110. In some embodiments, the inventory management engine 202 requests and receives inventory information maintained by the retailer 110. The inventory of each retailer 110 is unique and may change over time. The inventory management engine 202 monitors changes in inventory for each participating retailer 110. The inventory management engine 202 is also configured to store inventory records in an inventory database 204. The inventory database 204 may store information in separate records—one for each participating retailer 110—or may consolidate or combine inventory information into a unified record. Inventory information includes both qualitative and quantitative information about items, including size, color, weight, SKU, serial number, and so on. In some embodiments, the inventory database 204 also stores purchasing rules associated with each item, if they exist. For example, age-restricted items such as alcohol and tobacco are flagged accordingly in the inventory database 204.

In some embodiments, the inventory database 204 stores item embeddings for items offered for sale on the online concierge system 102. An item embedding is an embedding that describes an item. The item embeddings may be associated with specific items stored by the inventory database 204. For example, each brand of an item may have an individual item embedding, or items may have different item embeddings for each retailer that sells the item. Alternatively, each item embedding may be associated with a generic item, and each generic item is associated with specific items that are similar or substitutes of each other. For example, the inventory database 102 may store an item embedding for the generic item "milk", and the specific items of "Moo Moo 2% Milk" and "Greener Pastures Organic Whole Milk" may both be associated with the item embedding for "milk."

The inventory database 204 includes an availability database that stores data describing the availability of items. An item is available if the item can be collected by a picker at a retailer location, and an item is unavailable if the item cannot be collected by a picker. For example, an item may be unavailable if the item is out-of-stock at a retailer location, meaning the retailer location does not have the item available for purchase to the public. In some embodiments, an item is unavailable if the item is not present on displays within the retailer location on which the item should be displayed for collection by customers or pickers. The availability database may store the availability data for an item on a per-location basis. For example, the availability database may indicate that an item is available at one retailer location and unavailable at another. In some embodiments, the availability database stores an availability score indicating the likelihood that an item is available at a retailer location for each item-location pairing.

The online concierge system 102 uses the availability database to determine which items to present to a customer. For example, if a customer searches for an item, the online concierge system 102 checks the availability database to determine whether the item is available. If the item is available, the online concierge system 102 presents the item to the customer. If the item is unavailable, the online concierge system 102 may not present the item to the user in search results or may indicate to the user that the item is unavailable.

The availability database is generated and updated by the availability determination module 218. The availability determination module 218 receives images from shopping carts 120 and determines whether items are unavailable based on whether items that are expected to be depicted in the image data are actually depicted. The availability determination module 218 determines a set of items that the availability determination module 218 expects to detect in an image from the shopping cart 120. The availability determination module 218 determines which items should be detected in the image based on the location of the shopping cart 120 in the retailer location. The availability determination module 218 compares the expected set of items to a set of items that the availability determination module 218 actually identifies in the image, and determines which of the expected set of items were not identified in the image. Those items are determined to be unavailable at the retailer location within which the shopping cart 120 is located and the availability determination module 218 updates the availability database to indicate that those items are unavailable. The availability determination module 218 and the availability database, in accordance with some embodiments, are described in further detail below.

The online concierge system 102 also includes an order fulfillment engine 206 which is configured to synthesize and display an ordering interface to each customer 104 (for example, via the customer mobile application 106). The order fulfillment engine 206 is also configured to access the inventory database 204 in order to determine which items are available at which retailers 110. The order fulfillment engine 206 determines a sale price for each item ordered by a customer 104. Prices set by the order fulfillment engine 206 may or may not be identical to in-store prices determined by retailers (which is the price that customers 104 and pickers 108 would pay at retailers). The order fulfillment engine 206 also facilitates transactions associated with each order. In some embodiments, the order fulfillment engine 206 charges a payment instrument associated with a customer 104 when he/she places an order. The order fulfillment engine 206 may transmit payment information to an external payment gateway or payment processor. The order fulfillment engine 206 stores payment and transactional information associated with each order in a transaction records database 208.

In some embodiments, the order fulfillment engine 206 also shares order details with retailer 110. For example, after successful fulfillment of an order, the order fulfillment engine 206 may transmit a summary of the order to the appropriate retailer. The summary may indicate the items purchased, the total value of the items, and in some cases, an identity of the picker 108 and customer 104 associated with the transaction. In some embodiments, the order fulfillment engine 206 pushes transaction and/or order details asynchronously to retailer systems. This may be accomplished via use of webhooks, which enable programmatic or system-driven transmission of information between web applications. In another embodiment, retailer systems may be configured to periodically poll the order fulfillment engine 206, which provides detail of all orders which have been processed since the last request.

The order fulfillment engine 206 may interact with a picker management engine 210, which manages communication with and utilization of pickers 108. In some embodiments, the picker management engine 210 receives a new order from the order fulfillment engine 206. The picker management engine 210 identifies the appropriate retailer 110 to fulfill the order based on one or more parameters, such as the contents of the order, the inventory of the retailers, and the proximity to the delivery location. The picker management engine 210 then identifies one or more appropriate pickers 108 to fulfill the order based on one or more parameters, such as the pickers' proximity to the appropriate retailer 110 (and/or to the customer 104), his/her familiarity level with that particular retailer 110, and so on. Additionally, the picker management engine 210 accesses a picker database 212 which stores information describing each picker 108, such as his/her name, rating, previous shopping history, and so on. The picker management engine 210 transmits the list of items in the order to the picker 108 via the picker mobile application 112. The picker database 212 may also store data describing the sequence in which the pickers' picked the items in their assigned orders.

As part of fulfilling an order, the order fulfillment engine 206 and/or picker management engine 210 may access a customer database 214 which stores information describing each customer. This information could include each customer's name, address, gender, shopping preferences, favorite items, stored payment instruments, and so on.

The online concierge system 102 may use a communication engine 216 that transmits information between the customer mobile application 106, the picker mobile application 112, and the runner mobile application 116. The information may be sent in the form of messages, such as texts or emails, or notifications via application, among other forms of communication. The communication engine 216 may receive information from each application about the status of an order, the location of a customer in transit, issues with items in an order, and the like. The communication engine 216 determines a message or notification to send to a customer 104, picker 108, or runner 114 based on this information and transmits the notifications to the appropriate application. For example, the online concierge system 102 may receive information from the customer mobile application 106 indicating that a customer 104 is traveling to the pickup location to retrieve an order. Based on this information, the communication engine 216 sends a notification to the runner mobile application 116 indicating that the customer 104 associated with a specific order is in transit, which may incite the runner 114 to retrieve the order for pick up. In another example, the online concierge system 102 may receive a message from the picker mobile application 112 that an item of an order is not available. The communication engine 216 may transmit the message to the customer mobile application 106 associated with the order.

Figure 3A:
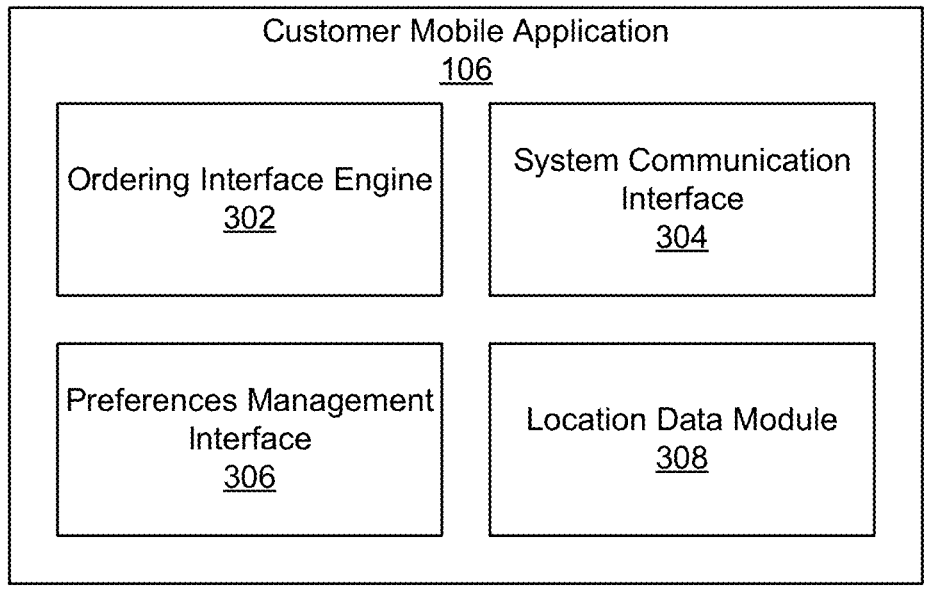
FIG. 3A is a block diagram of the customer mobile application (CMA), according to some embodiments.

FIG. 3A is a block diagram of the customer mobile application (CMA) 106, according to some embodiments. The CMA 106 illustrated in FIG. 3A includes an ordering interface engine 302, a system communication interface 304, a preferences management interface 306, and a location data module 308. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

The customer 104 accesses the CMA 106 via a client device, such as a mobile phone, tablet, laptop, or desktop computer. The CMA 106 may be accessed through an app running on the client device or through a website accessed in a browser. The CMA 106 includes an ordering interface 302, which provides an interactive interface with which the customer 104 can browse through and select items and place an order. The ordering interface 302 also may include a selected items list that specifies the amounts and prices of items that the customer 104 has selected to order. The customer 104 may review the selected items list and place an order based on the selected items list. Furthermore, the ordering interface 302 may present recipes to the customer 104 that the online concierge system 102 predicts the customer 104 is attempting to complete, and may provide an option to the customer 104 to add additional items needed to complete a recipe to the customer's selected items list.

Customers 104 may also use the ordering interface 302 to message with pickers 108 and runners 114 and receive notifications regarding the status of their orders. The CMA 106 also includes a system communication interface 304 which, among other functions, receives inventory information from the online concierge system 102 and transmits order and location information to the online concierge system 102. The CMA 106 also includes a preferences management interface 306 which allows the customer 104 to manage basic information associated with his/her account, such as his/her home address and payment instruments. The preferences management interface 306 may also allow the customer to manage other details such as his/her favorite or preferred retailers 110, preferred handoff times, special instructions for handoff, and so on.

The CMA 106 also includes a location data module 308. The location data module 308 may access and store location data related to a client device associated with a customer 104 via the customer mobile application 106. Location data may include the geographic location of the client device associated with the customer mobile application 106, how fast the client device is traveling, the average speed of the client device when in transit, the direction of travel of the client device, the route the customer 104 is taking to a pickup location, current traffic data near the pickup location, and the like. For simplicity, the location of a customer client device or client device may be referred to as the location of the customer throughout this description. The customer 104 may specify whether or not to share this location data with the customer mobile application 106 via the preferences management interface 306. If a customer 104 does not allow the customer mobile application 106 to access their location data, the location data module 308 may not access any location data for the customer 104. In some embodiments, the customer 104 may specify certain scenarios when the location data module 308 may receive location data, such as when the customer 104 is using the customer mobile application 106, any time, or when the customer 104 turns on location tracking in the customer mobile application 106 via an icon. The customer 104 may also specify which location data the location data module 308 may retrieve, and which location data is off-limits. In some embodiments, the location data module 308 may be tracking the customer's 104 location as a background process while the CMA 106 is in use. In other embodiments, the CMA 106 may use real-time location data from the location data module 308 to display a map to the customer 104 indicating their current location and the route to a pickup location for their order.

Figure 3B:
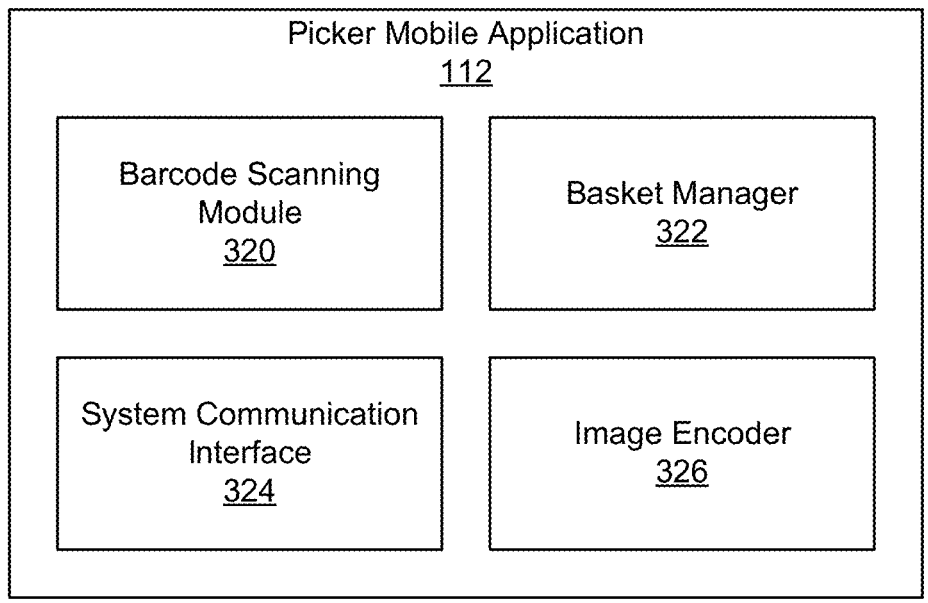
FIG. 3B is a block diagram of the picker mobile application (PMA), according to some embodiments.

FIG. 3B is a block diagram of the picker mobile application (PMA) 112, according to some embodiments. The PMA 112 illustrated in FIG. 3B includes a barcode scanning module 320, a basket manager 322, a system communication interface 324, and an image encoder 326. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

The picker 108 accesses the PMA 112 via a mobile client device, such as a mobile phone or tablet. The PMA 112 may be accessed through an app running on the mobile client device or through a website accessed in a browser. The PMA 112 includes a barcode scanning module 320 which allows a picker 108 to scan an item at a retailer location 110 (such as a can of soup on the shelf at a grocery store). The barcode scanning module 320 may also include an interface which allows the picker 108 to manually enter information describing an item (such as its serial number, SKU, quantity and/or weight) if a barcode is not available to be scanned. The PMA 112 also includes a basket manager 322 which maintains a running record of items collected by the picker 108 for purchase at a retailer 110. This running record of items is commonly known as a "basket". In some embodiments, the barcode scanning module 320 transmits information describing each item (such as its cost, quantity, weight, etc.) to the basket manager 322, which updates its basket accordingly. The PMA 112 also includes an image encoder 326 which encodes the contents of a basket into an image. For example, the image encoder 326 may encode a basket of goods (with an identification of each item) into a quick-response (QR) code which can then be scanned by an employee of the retailer 110 at check-out.

The PMA 112 also includes a system communication interface 324, which interacts with the online concierge system 102. For example, the system communication interface 324 receives information from the online concierge system 102 about the items of an order, such as when a customer updates an order to include more or less items. The system communication interface may receive notifications and messages from the online concierge system 102 indicating information about an order. The system communication interface transmits notifications and messages to be displayed via a user interface of the mobile device associated with the PMA 112.

Figure 3C:
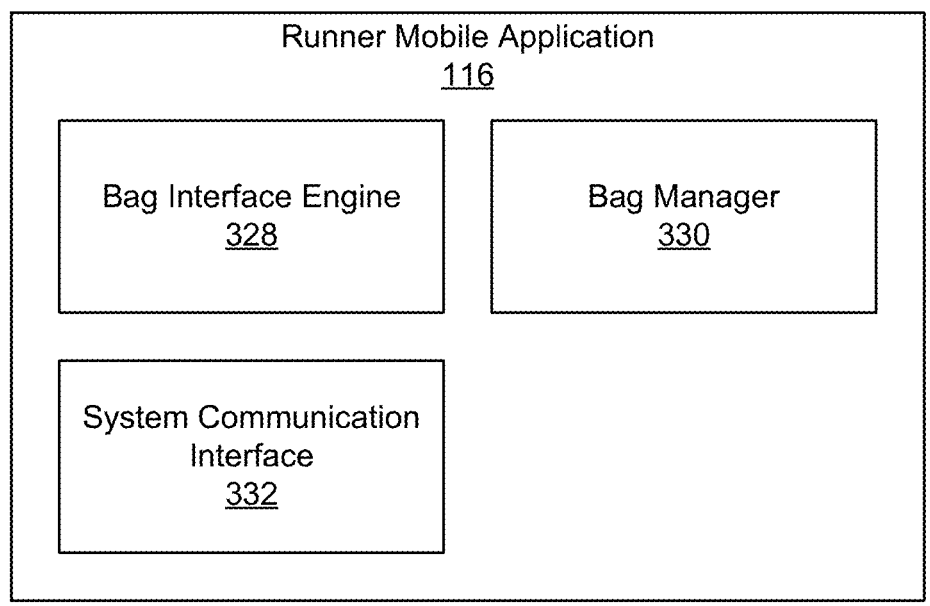
FIG. 3C is a block diagram of the runner mobile application (RMA), according to some embodiments.

FIG. 3C is a block diagram of the runner mobile application (RMA) 116, according to some embodiments. The RMA 116 illustrated in FIG. 3C includes a bag interface engine 328, a bag manager 330, and a system communication interface 332. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

The runner 114 accesses the RMA 116 via a client device, such as a mobile phone, tablet, laptop, or desktop computer. The RMA 116 may be accessed through an app running on the client device or through a website accessed in a browser. The RMA 116 includes bag interface engine 328, which provides an interactive interface with which the runner 114 can view orders they need to deliver and the locations of the bags for each order, such as on a particular shelf or in a refrigerator of a pickup location. The runner 114 may receive notifications through the bag interface engine 328 about new orders, the location of a customer 104 who is in transit to a pickup location, and new orders to deliver. The runner 114 may also receive communications via the bag interface engine 328 with customers regarding order handoff and pickup confirmation and may interact with the interface generated by the bag interface engine 328 to send communications to customers and the online concierge system 102 regarding order status. For example, a runner 114 may send the customer a pickup spot at the pickup location to meet for order handoff and indicate that an order has been delivered to a customer via the interface, which ends the wait time calculation by the location data module 308 associated with the customer.

The RMA 116 includes a bag manager 330 that manages the assignment of orders to runners 114 and the locations of bags for each order. The RMA 116 also includes a system communication interface 332 which, among other functions, receives inventory information from the online concierge system 102 and transmits order and bag information to the online concierge system 102. The system communication interface may also receive notifications and messages from the online concierge system 102 indicating information about an order. The system communication interface transmits notifications and messages to be displayed via a user interface of the mobile device associated with the RMA 116.

Example Availability Detection Module

Figure 4:
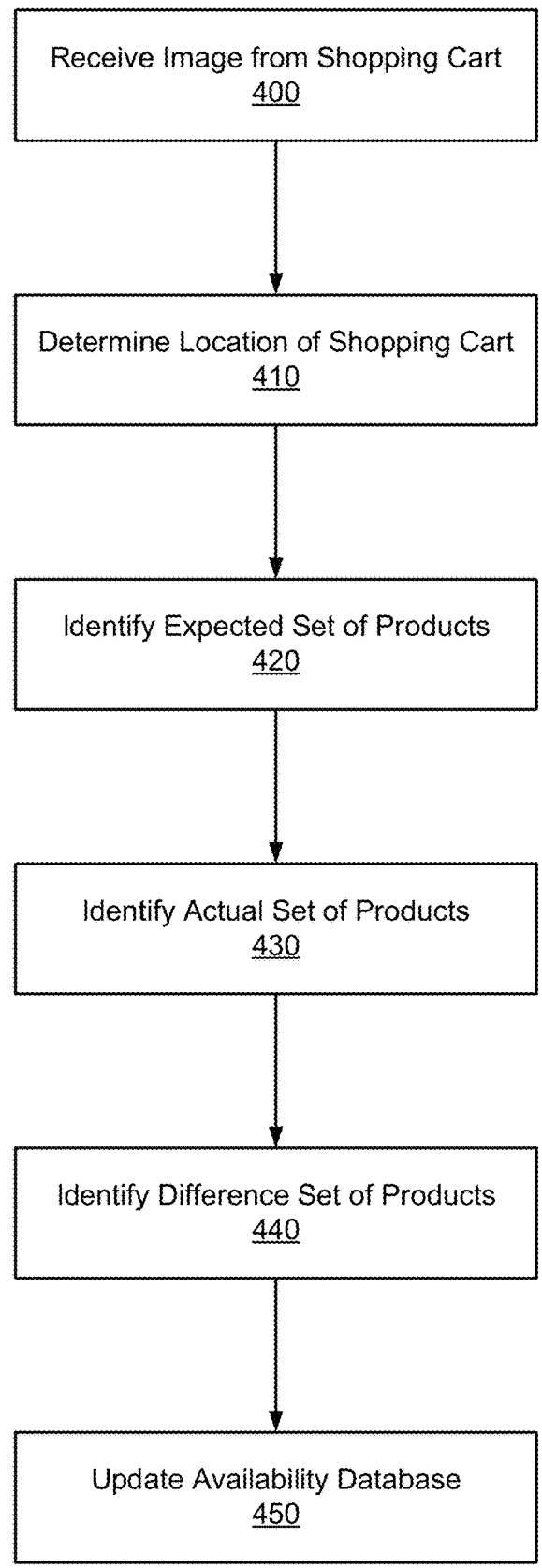
FIG. 4 is a flowchart for an example method for determining the availability of an item in a retailer based on an image captured from a shopping cart, in accordance with some embodiments.

FIG. 4 is a flowchart of an example method for determining the availability of an item in a retailer location based on an image captured from a shopping cart, in accordance with some embodiments. Alternative embodiments may include more, fewer, or different steps from those illustrated in FIG. 4 and the steps may be performed in a different order from that illustrated in FIG. 4. Additionally, this method may be performed automatically by an online concierge system or may be performed in response to human instructions. In some embodiments, the method is performed by an availability determination module (e.g., availability determination module 218) of an online concierge system (e.g., online concierge system 102).

The online concierge system receives 400 an image from a shopping cart (e.g., shopping cart 120) in a retailer location. The image is captured by a camera coupled to the shopping cart, and the image depicts items on a display within the retailer location.

The online concierge system determines 410 a location of the shopping cart within the retailer location at the time that the image was taken. The online concierge system may request the location of the shopping cart from an indoor location system operating on the shopping cart. Alternatively, the online concierge system may determine the location of the shopping cart based on the received image. For example, the online concierge system may identify a location marker within the image that indicates a location of the shopping cart within the retailer location. The location marker is a real-world object that is detectable by the online concierge system. For example, a QR code or a barcode may be used as a location marker. In some embodiments, the online concierge system uses barcodes for price tags for items as location markers within the retailer location. The online concierge system stores a mapping of location markers to locations within the retailer location. In some embodiments, the online concierge system identifies multiple location markers within the received image and uses the locations corresponding to each of the location markers to determine the location of the shopping cart when the image was captured.

In some embodiments, the shopping cart's location includes the shopping cart's orientation within the retailer location. The online concierge system may receive the shopping cart's orientation from the shopping cart or may determine the shopping cart's orientation directly based on sensor data received from the shopping cart (e.g., based on compass data, gyroscopic data, or accelerometer data).

The online concierge system identifies 420 an expected set of items based on the shopping cart's location. The expected set of items is a set of items that the online concierge system expects to be depicted by the image if all of the items were available in the retailer location. In other words, if the image depicts a display in the retailer location where an item should be displayed, then the online concierge system would identify that item as being in the expected set of items. The online concierge system may identify the expected set of items using an item map of the retailer location. The item map identifies the locations within the retailer location where items are displayed for collection by pickers or by patrons at the retailer location. The item map stores item locations in a two-dimensional plane representing the floor of the retailer location. The item map can also store item locations in a third dimension. For example, the item map may indicate on which level of a set of shelves an item is displayed. In some embodiments, the item map is a planogram specifying where items should be displayed in the retailer location. The online concierge system uses the shopping cart's location and the item map to determine which items are located within the field of view corresponding to the image. In some embodiments, the online concierge system also uses the shopping cart's orientation to identify the expected set of items.

In some embodiments, the online concierge system identifies the expected set of items based on barcodes that the online concierge system identifies in the image. For example, the online concierge system may store a machine-learning model that has been trained to identify barcodes that are coupled to displays for items. The online concierge system may use this machine-learning model to identify barcodes that correspond to items that should be displayed in the image to identify the expected set of items.

The online concierge system identifies 430 an actual set of items depicted in the image. The actual set of items are the items that are present on the displays depicted in the image, meaning the items are available for collection by picker or by patrons at the retailer location. The online concierge system identifies the actual set of items by applying computer-vision techniques to the image. For example, the online concierge system may apply a machine-learning model (e.g., a neural network) to the image. This machine-learning model may be trained to identify items in an image. In some embodiments, this machine-learning model is trained to identify items by identifying barcodes depicted in the image.

The online concierge system identifies 440 a difference set of items based on the expected set of items and the actual set of items. The difference set of items is the set of items that are in the expected set of items but not in the actual set of items. Thus, the difference set of items represents the items that the online concierge system expects to be depicted in the image, but that are not depicted.

The online concierge system determines that the items in the difference set of items are unavailable at the retailer location and updates 450 an availability database to indicate that the items in the difference set of items are unavailable. The online concierge system may update the availability database such that the items are designated as unavailable at the retailer location within which the shopping cart is located.

In addition to updating the availability database, the online concierge system may notify the retailer that the item is unavailable. For example, the online concierge system may transmit a notification to a computing system operated by the retailer that notifies the retailer that the item is out of stock. Additionally, the online concierge system may instruct a picker to verify that an item in the difference set of items is actually unavailable. For example, if the shopping cart is in use by a picker, the online concierge system may transmit a notification to the shopping cart to present to the picker that requests that the picker verify that an item is unavailable. Alternatively, the online concierge system may ask another picker that is in the retailer location to verify that the item is unavailable while that picker collects items for an order.

The online concierge system uses the availability database when presenting items to a customer for the customer's selection for ordering. For example, the online concierge system may receive a search query from a customer for a set of items that are available for ordering from a retailer. The online concierge system may generate a set of candidate items that satisfy the customer's search query (e.g., using a machine-learning model) and uses the availability database to determine whether those candidate items are available. If the availability database indicates that a candidate item is unavailable, the online concierge system may filter out that candidate item from the set of candidate items, and may present only the filtered set of candidate items to the customer. Alternatively, the online concierge system presents the full set of candidate items to the customer, but indicates to the customer which of the candidate items, if any, were determined to be unavailable.

In some embodiments, the online concierge system receives an order from a customer for delivery to the customer at a delivery location during a later time frame. Between the time when the customer placed the order and the later time frame, the online concierge system may determine that an item in the order is unavailable. The online concierge system notifies the customer that an item in their order is no longer available and may request that the customer select alternatives to the unavailable item.

In some embodiments, the online concierge system uses images received from the shopping cart to automatically generate labeled training data for training an item availability model. An item availability model is a machine-learning model that is trained to predict the availability of an item based on order data describing orders placed by customers, inventory data describing the inventory of items at retailers, or other suitable data that describes factors that may impact the availability of an item. The online concierge system may use the item availability model to predict whether an item is available at a retailer location, and may compare the prediction from the item availability model to an entry in the availability database that was updated based on images received from a shopping cart. In some embodiments, the online concierge system generates training examples to which the item availability model can be applied, and which include a label generated based on images from the shopping cart.

While FIG. 4 is described in the context of receiving a single image from a shopping cart, alternative embodiments may use multiple images captured by externally-facing cameras on the shopping cart to determine the availability of items at the retailer location. For example, the online concierge system may identify the expected set of items based on the shopping carts location, and may identify the actual set of items based on items that the online concierge system detects in each of a set of images received from the shopping cart.

Figure 5:
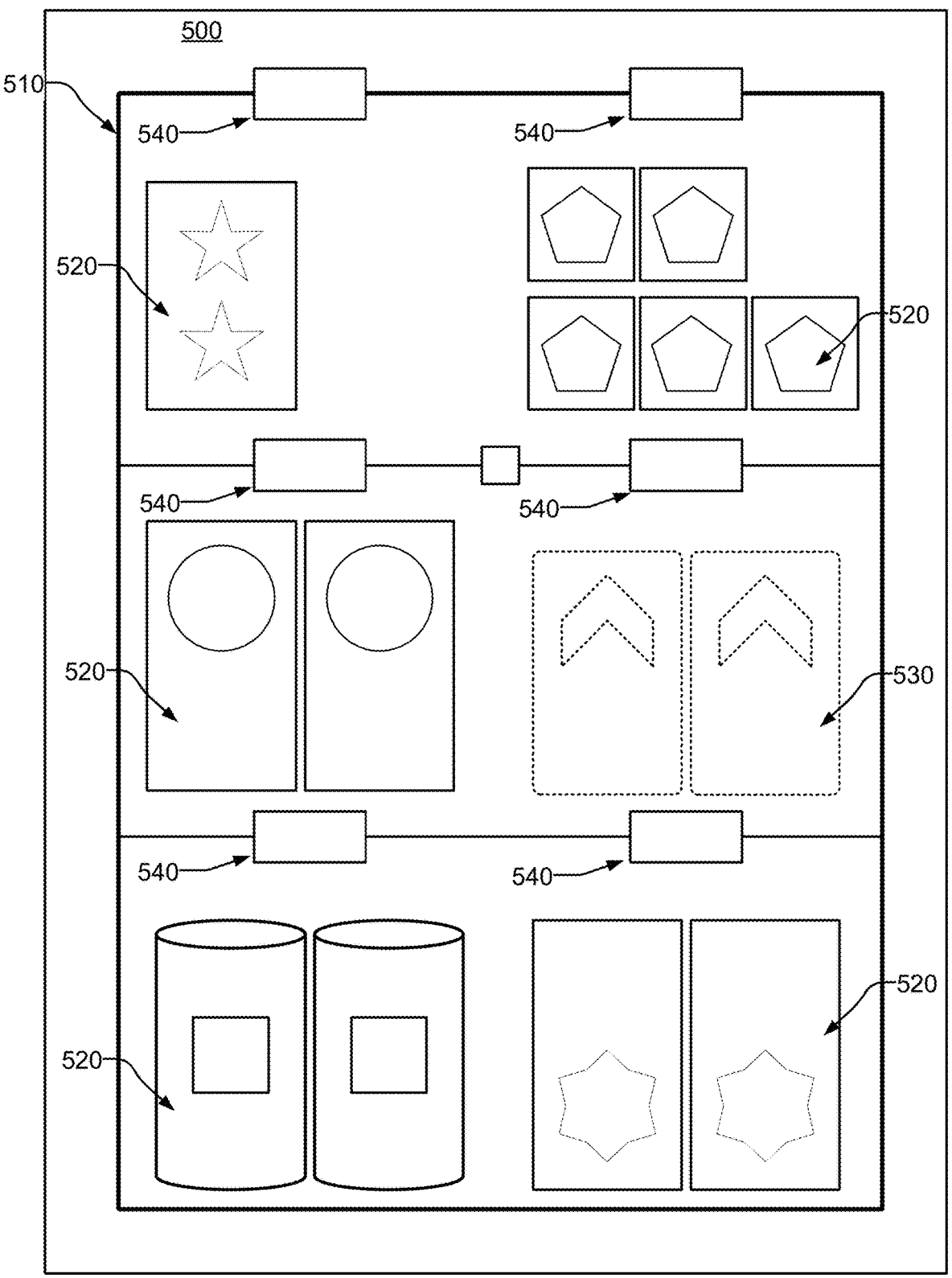
FIG. 5 is an example image captured by a shopping cart, in accordance with some embodiments.

FIG. 5 illustrates an example image 500 captured by a shopping cart, in accordance with some embodiments. The image 500 depicts a display 510 containing items 520 that are available for collection by pickers or patrons of the retailer. In FIG. 5, an item 530 is out of stock on the display 510. The online concierge system identifies an expected set of items that includes the in-stock items 520 and the out-of-stock item 530, and identifies the actual set of items that includes the in-stock items 520 but not the out-of-stock item 530. The online concierge system thereby identifies a difference set of items that includes the out-of-stock item 530 and updates an availability database to indicate that the item 530 is unavailable.

Additionally, the image 500 depicts potential location markers that the online concierge system may use to determine the location of the shopping cart when the image 500 was captured. For example, the online concierge system may identify barcodes 540 for the items and compare the barcodes to an item map to determine the location of the shopping cart. The online concierge system also may identify a QR code 550 that indicates the location of the display 510 in the retailer, and the online concierge system may use the location of the display 510 to determine the location of the shopping cart.

OTHER CONSIDERATIONS

The foregoing description of the embodiments has been presented for the purpose of illustration; it is not intended to be exhaustive or to limit the patent rights to the precise pages disclosed. Many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some embodiments, a software module is implemented with a computer program product comprising one or more computer-readable media containing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to an apparatus for performing the operations herein. This apparatus may be specially constructed for the required purposes, or it may comprise a computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

The description herein may describe processes and systems that use machine learning models in the performance of their described functionalities. A "machine learning model," as used herein, comprises one or more machine learning models that perform the described functionality. Machine learning models may be stored on one or more computer-readable media with a set of weights. These weights are parameters used by the machine learning model to transform input data received by the model into output data. The weights may be generated through a training process, whereby the machine learning model is trained based on a set of training examples and labels associated with the training examples. The weights may be stored on one or more computer-readable media, and are used by a system when applying the machine learning model to new data.

The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C having at least one element in the combination that is true (or present). As a not-limiting example, the condition "A, B, or C" is satisfied by A and B are true (or present) and C is false (or not present). Similarly, as another not-limiting example, the condition "A, B, or C" is satisfied by A is true (or present) and B and C are false (or not present).

What is claimed is:

1. A method comprising:
at a computer system, comprising at least one processor and memory:
capturing an image by a camera coupled to a shopping cart, wherein the image depicts items on display in a region of a retailer location associated with a retailer;
determining a location of the shopping cart within the retailer location when the image was captured by the shopping cart by capturing a location measurement using a location sensor coupled to the shopping cart;
identifying, by a first process, an expected set of items for the image based on the captured image and the determined location, wherein the expected set of items is a set of items that are expected to be depicted in the image, and wherein identifying the expected set of items comprises:
applying a first machine-learning model to the captured image to identify a set of barcodes depicted in the captured image, wherein the set of barcodes are coupled to a display for items depicted in the image; and
identifying an item of a plurality of items associated with the retailer corresponding to each of the identified barcodes as an expected item for the expected set of items;
identifying, by a second process separate from the first process, an actual set of items depicted in the image by applying a second machine-learning model to the image, wherein the second machine-learning model is computer-vision model that is trained to identify items depicted in an image, wherein the actual set of items is a set of items that are identified by the second machine-learning model as depicted in the image, wherein the expected set of items identified based on the identified barcodes comprises more items than the actual set of items depicted in the image;
identifying a difference set of items, wherein the difference set of items comprises items that are in the expected set of items expected to be depicted in the image but are not in the actual set of items identified by the second machine-learning model as depicted in the image;
updating an availability database for an online system to indicate that items in the difference set of items are unavailable;
receiving an order from a client device associated with a user of the online system, wherein the order comprises an item from the difference set of items;
determining that the item is unavailable by accessing the updated availability database; and
transmitting, to the client device, an indication that the item is unavailable.

2. The method of claim 1, further comprising:
receiving a search query request from a client device of a user, wherein the search query request comprises a search query;
identifying a set of candidate items that are related to the search query from the search query request; and
determining whether each candidate item in the set of candidate items is available by accessing the updated availability database.

3. The method of claim 2, further comprising:
responsive to determining that a candidate item in the set of candidate items is unavailable, filtering the set of candidate items to remove the unavailable candidate item; and
transmitting the filtered set of candidate items to the client device for presentation to the user.

4. The method of claim 3, further comprising:
responsive to determining that a candidate item in the set of candidate items is unavailable, transmitting the set of candidate items to the client device for presentation to the user such that the unavailable candidate item is presented to the user with an indication that the unavailable candidate item is unavailable.

5. The method of claim 1, wherein determining the location of the shopping cart comprises:
identifying a location marker in the image.

6. The method of claim 5, wherein the location marker is a QR code.

7. The method of claim 5, wherein the location marker is a barcode for an item in the expected set of items.

8. The method of claim 1, wherein identifying the expected set of items comprises:
accessing an item map associated with the retailer location, wherein the item map indicates physical locations within the retailer location of items offered for collection within the retailer location.

9. The method of claim 1, wherein the location measurement of the shopping cart comprises an orientation of the shopping cart.

10. The method of claim 1, further comprising:
transmitting a notification to a computing system operated by the retailer, wherein the notification indicates that the difference set of items are unavailable.

11. The method of claim 1, further comprising:
training an item availability model based on the updated availability database.

12. A non-transitory computer-readable medium storing instructions that, when executed by a processor, cause the processor to:
- capture an image by a camera coupled to a shopping cart, wherein the image depicts items on display in a region of a retailer location associated with a retailer;
- determine a location of the shopping cart within the retailer location when the image was captured by the shopping cart by capturing a location measurement using a location sensor coupled to the shopping cart;
- identify, by a first process, an expected set of items for the image based on the captured image and the determined location, wherein the expected set of items is a set of items that are expected to be depicted in the image, and wherein identifying the expected set of items further comprises:
- applying a first machine-learning model to the captured image to identify a set of barcodes depicted in the captured image, wherein the set of barcodes are coupled to a display for items depicted in the image; and
- identifying an item of a plurality of items associated with the retailer corresponding to each of the identified barcodes as an expected item for the expected set of items;
- identify, by a second process separate from the first process, an actual set of items depicted in the image by applying a second machine-learning model to the image, wherein the second machine-learning model is a computer-vision model that is trained to identify items depicted in an image, wherein the actual set of items is a set of items that are identified by the second machine-learning model as depicted in the image, wherein the expected set of items identified based on the identified barcodes comprises more items than the actual set of items depicted in the image;
- identify a difference set of items, wherein the difference set of items comprises items that are in the expected set of items expected to be depicted in the image but are not in the actual set of items identified by the second machine-learning model as depicted in the image;
- update an availability database for an online system to indicate that items in the difference set of items are unavailable;
- receive an order from a client device associated with a user of the online system, wherein the order comprises an item from the difference set of items;
- determine that the item is unavailable by accessing the updated availability database; and
- transmit, to the client device, an indication that the item is unavailable.

13. The computer-readable medium of claim 12, further storing instructions that cause the processor to:
- receive a search query request from a client device of a user, wherein the search query request comprises a search query;
- identify a set of candidate items that are related to the search query from the search query request; and
- determine whether each candidate item in the set of candidate items is available by accessing the updated availability database.

14. The computer-readable medium of claim 13, further storing instructions that cause the processor to:
- responsive to determining that a candidate item in the set of candidate items is unavailable, filter the set of candidate items to remove the unavailable candidate item; and
- transmit the filtered set of candidate items to the client device for presentation to the user.

15. The computer-readable medium of claim 14, further storing instructions that cause the processor to:
- responsive to determining that a candidate item in the set of candidate items is unavailable, transmit the set of candidate items to the client device for presentation to the user such that the unavailable candidate item is presented to the user with an indication that the unavailable candidate item is unavailable.

16. The computer-readable medium of claim 12, wherein the instructions for determining the location of the shopping cart further cause the processor to:
- identify a location marker in the image.

17. The computer-readable medium of claim 12, wherein the instructions for identifying the expected set of items further cause the processor to:
- access an item map associated with the retailer location, wherein the item map indicates physical locations within the retailer location of items offered for collection within the retailer location.

18. The computer-readable medium of claim 12, wherein the location measurement of the shopping cart comprises an orientation of the shopping cart.

19. A system comprising:
- a processor; and
- a non-transitory computer-readable medium storing instructions that, when executed by the processor, cause the processor to:
- capture an image by a camera coupled to a shopping cart wherein the image depicts items on display in a region of a retailer location associated with a retailer;
- determine a location of the shopping cart within the retailer location when the image was captured by the shopping cart by capturing a location measurement using a location sensor coupled to the shopping cart;
- identify, by a first process, an expected set of items for the image based on the captured image and the determined location, wherein the expected set of items is a set of items that are expected to be depicted in the image, and wherein identifying the expected set of items further comprises:
- applying a first machine-learning model to the captured image to identify a set of barcodes depicted in the captured image, wherein the set of barcodes are coupled to a display for items depicted in the image; and
- identifying an item of a plurality of items associated with the retailer corresponding to each of the identified barcodes as an expected item for the expected set of items;
- identify, by a second process separate from the first process, an actual set of items depicted in the image by applying a second machine-learning model to the image, wherein the second machine-learning model is a computer-vision model that is trained to identify items depicted in an image, wherein the actual set of items is a set of items that are identified by the second machine-learning model as depicted in the image, wherein the expected set of items identified based on the identified barcodes comprises more items than the actual set of items depicted in the image;
- identify a difference set of items, wherein the difference set of items comprises items that are in the expected set of items expected to be depicted in the image but are not in the actual set of items identified by the second machine-learning model as depicted in the image;

update an availability database for an online system to indicate that items in the difference set of items are unavailable;

receive an order from a client device associated with a user of the online system, wherein the order comprises an item from the difference set of items;

determine that the item is unavailable by accessing the updated availability database; and transmit, to the client device, an indication that the item is unavailable.

* * * * *